(12) United States Patent
Bogdan, Jr. et al.

(10) Patent No.: US 8,603,671 B2
(45) Date of Patent: Dec. 10, 2013

(54) COMPOSITION, ENERGY STORAGE DEVICE, AND RELATED PROCESSES

(75) Inventors: David Charles Bogdan, Jr., Scotia, NY (US); Michael Alan Vallance, Loudonville, NY (US); Richard Louis Hart, Broadalbin, NY (US)

(73) Assignee: General Electric Company, Niskayuna, NY (US)

( * ) Notice: Subject to any disclaimer, the term of this patent is extended or adjusted under 35 U.S.C. 154(b) by 360 days.

(21) Appl. No.: 12/977,471

(22) Filed: Dec. 23, 2010

(65) Prior Publication Data

US 2012/0164524 A1 Jun. 28, 2012

(51) Int. Cl.
*H01M 6/04* (2006.01)

(52) U.S. Cl.
USPC .......................................... 429/199; 429/102

(58) Field of Classification Search
None
See application file for complete search history.

(56) References Cited

U.S. PATENT DOCUMENTS

| | | | |
|---|---|---|---|
| 4,546,055 A | 10/1985 | Coetzer et al. | |
| 4,626,483 A * | 12/1986 | Bones et al. | 429/50 |
| 5,573,873 A | 11/1996 | Bugga et al. | |
| 5,972,533 A | 10/1999 | Coetzer | |
| 2009/0162736 A1 * | 6/2009 | Vallance et al. | 429/50 |
| 2010/0068610 A1 * | 3/2010 | Sudworth | 429/102 |

OTHER PUBLICATIONS

Lu et al., "Advanced Materials for Sodium-Beta Alumina Batteries: Status, Challenges and Perspectives", Journal of Power Sources, May 1, 2010, vol. 195, Issue 9, pp. 2431-2442.

Ratnakumar et al., "Sodium—Metal Chloride Battery Research at the Jet Propulsion Laboratory (JPL)" Journal of Power Sources, Dec. 1, 1991, vol. 36, Issue 3, pp. 385-394.

* cited by examiner

*Primary Examiner* — Patrick Ryan
*Assistant Examiner* — Jose Colucci Rios
(74) *Attorney, Agent, or Firm* — Francis T. Coppa

(57) ABSTRACT

A positive electrode composition is provided. The composition includes at least one electroactive metal, such as titanium, vanadium, niobium, molybdenum, nickel, cobalt, chromium, manganese, silver, antimony, cadmium, tin, lead, and zinc. The composition further includes iron, at least one first alkali metal halide; and an electrolyte salt. The electrolyte salt can be based on a reaction product of a second alkali metal halide and an aluminum halide, and has a melting point of less than about 300 degrees Celsius. An article, an energy storage device, and an uninterruptable power supply device that includes the positive electrode composition are also described; as is a method of forming the energy storage device.

14 Claims, 2 Drawing Sheets

COMPOSITION, ENERGY STORAGE DEVICE, AND RELATED PROCESSES

BACKGROUND

The invention includes embodiments that relate to an electrode composition and method of its making. The invention includes embodiments that relate to an electrode for an energy storage device.

Metal chloride batteries, especially sodium-nickel chloride batteries with a molten sodium anode and a beta-alumina solid electrolyte, are widely employed for energy storage applications. When the metal chloride batteries are employed in mobile applications like hybrid locomotives or plug-in electric vehicles (PHEV), the batteries should be capable of providing power surges (high currents), during discharging of the battery. This should be achieved without a significant loss in the working capacity and the cycle life of the battery. To provide better fuel economy via regenerative braking (a power generation system, e.g., in PHEV's), better electric efficiency is desirable, since the ratio of discharged to charged energy decreases with an increase in current. Attempts have been made to provide positive electrode compositions that can tolerate power surges. In general, there exists a need for an improved solution to the long-standing problem of high current cell performance. Modifying the positive electrode composition may provide one such solution, since an improved composition may significantly improve the cell working capacity, and decrease the capacity degradation rate.

BRIEF DESCRIPTION

In accordance with one aspect of the present invention, a positive electrode composition is provided. The positive electrode composition includes at least one electroactive metal selected from the group consisting of titanium, vanadium, niobium, molybdenum, nickel, cobalt, chromium, manganese, silver, antimony, cadmium, tin, lead, and zinc. The electroactive metal is present in an amount in a range from about 10 volume percent to about 20 volume percent, based on the volume of the positive electrode composition. The composition further includes iron, present in an amount in a range from about 0.2 volume percent to about 3 volume percent, based on the volume of the positive electrode composition; a first alkali metal halide; and an electrolyte salt comprising a reaction product of a second alkali metal halide and an aluminum halide, wherein the electrolyte salt has a melting point of less than about 300 degrees Celsius.

In accordance with one aspect of the present invention, an article is provided. The article includes a positive electrode composition. The positive electrode composition includes at least one electroactive metal selected from the group consisting of titanium, vanadium, niobium, molybdenum, nickel, cobalt, chromium, manganese, silver, antimony, cadmium, tin, lead, and zinc; wherein the electroactive metal is present in an amount in a range from about 10 volume percent to about 20 volume percent, based on the volume of the positive electrode composition. The composition further includes iron in an amount in a range from about 0.2 volume percent to about 3 volume percent, based on the volume of the positive electrode composition; a first alkali metal halide; and an electrolyte salt comprising a reaction product of a second alkali metal halide and an aluminum halide, wherein the electrolyte salt has a melting point of less than about 300 degrees Celsius.

In accordance with another aspect of the present invention, an energy storage device is provided. In general, such devices are known in the art; and methods for making and operating them are also known. In this instance, the device includes (a) a first compartment comprising an alkali metal; (b) a second compartment including a positive electrode composition, the positive electrode composition including: at least one electroactive metal selected from the group consisting of titanium, vanadium, niobium, molybdenum, nickel, cobalt, chromium, manganese, silver, antimony, cadmium, tin, lead, and zinc; wherein the electroactive metal is present in an amount in a range from about 10 volume percent to about 20 volume percent, based on the volume of the positive electrode composition; iron present in an amount in a range from about 0.2 volume percent to about 3 volume percent, based on the volume of the positive electrode composition; at least a first alkali metal halide; and an electrolyte salt comprising a reaction product of a second alkali metal halide and an aluminum halide, wherein the electrolyte salt has a melting point of less than about 300 degrees Celsius; and (c) a solid separator capable of transporting alkali metal ions between the first and the second compartments.

In accordance with another aspect of the present invention, an uninterruptable power supply (UPS) device is provided. The device includes an energy storage unit that incorporates a positive electrode composition, as mentioned above and further described below.

In accordance with yet another aspect of the present invention, a method for preparation of the energy storage device is provided. The method comprises providing a housing having an interior surface defining a volume; disposing a separator inside the housing, wherein the separator has a first surface that defines at least a portion of a first compartment, and a second surface that defines a second compartment; wherein the first compartment is in ionic communication with the second compartment through the separator; and disposing a positive electrode composition in the second compartment, wherein the positive electrode composition is as described below.

BRIEF DESCRIPTION OF THE FIGURES

These and other features, aspects, and advantages of the present invention will become better understood when the following detailed description is read with reference to the accompanying drawings in which like characters represent like parts throughout the drawings, wherein.

DETAILED DESCRIPTION

Figure 1:
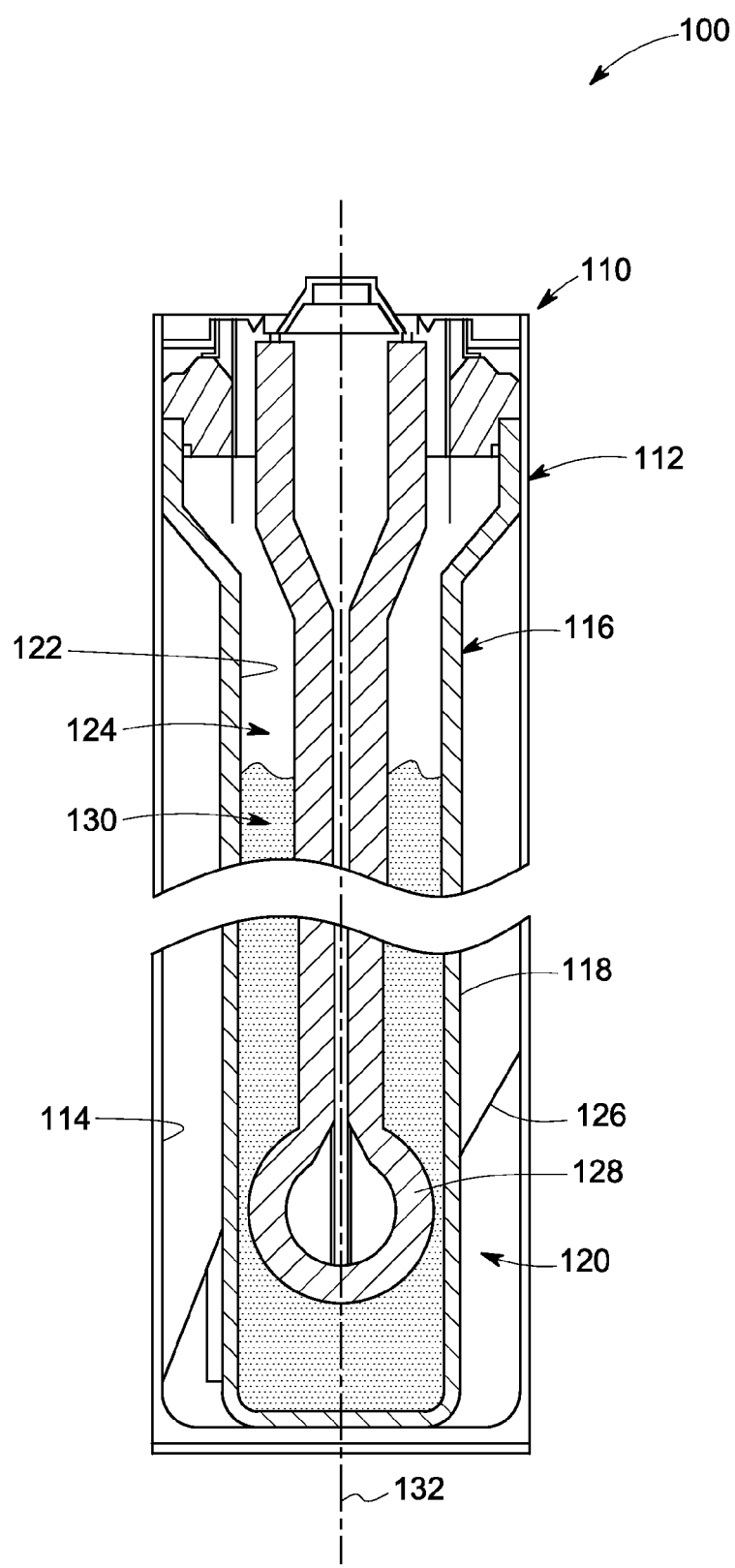
FIG. 1 is a schematic view illustrating a front cross-sectional view of an electrochemical cell in accordance with an embodiment of the invention.

The invention relates generally to a positive electrode composition. More particularly, the invention relates to a positive electrode composition for an energy storage device. The invention includes embodiments that relate to a method of making the energy storage device.

Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term.

As used herein, the terms "may" and "may be" indicate a possibility of an occurrence within a set of circumstances; a possession of a specified property, characteristic or function. These terms may also qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances, an event or capacity can be expected, while in other circumstances the event or capacity cannot occur—this distinction is captured by the terms "may" and "may be".

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

"Optional" or "optionally" means that the subsequently described event or circumstance may or may not occur, and that the description includes instances where the event occurs and instances where it does not.

Furthermore, whenever a particular feature of the invention is said to comprise or consist of at least one of a number of elements of a group and combinations thereof, it is understood that the feature may comprise or consist of any of the elements of the group, either individually or in combination with any of the other elements of that group.

When introducing elements of various embodiments of the present invention, the articles "a," "an," "the," and "said" are intended to mean that there are one or more of the elements. The terms "comprising," "including," and "having" are intended to be inclusive, and mean that there may be additional elements other than the listed elements. Furthermore, the terms "first," "second," and the like, herein do not denote any order, quantity, or importance, but rather are used to distinguish one element from another.

Embodiments of the invention described herein address the noted shortcomings of the state of the art. These embodiments advantageously provide an improved positive electrode composition for use in a metal-metal chloride battery—for example, a sodium-nickel chloride battery. The positive electrode composition comprises at least one electroactive metal selected from the group consisting of titanium, vanadium, niobium, molybdenum, nickel, cobalt, chromium, manganese, silver, antimony, cadmium, tin, lead, and zinc; wherein the electroactive metal is present in an amount in a range from about 10 volume percent to about 20 volume percent, based on the volume of the positive electrode composition; iron present in an amount in a range from about 0.2 volume percent to about 3 volume percent, based on the volume of the positive electrode composition; at least one first alkali metal halide; and an electrolyte salt comprising a reaction product of a second alkali metal halide and an aluminum halide, wherein the electrolyte salt has a melting point of less than about 300 degrees Celsius. The positive electrode composition may also include products of the chemical or electrochemical interaction of the various elements listed herein.

It is believed that the particular features set forth above for the positive electrode composition can enhance the performance of an energy storage device in which the positive electrode is incorporated, e.g., a device based on high-temperature metal-halide/sodium cells, by increasing the maximum discharge power density of the cells. This may also increase the amount of time that these cells can sustain high-power discharging.

Embodiments of the invention also provide an article, and an energy storage device comprising the positive electrode composition described herein. More particularly, the energy storage device includes an uninterruptable power supply (UPS) device, which is a device designed to deliver high power for a short duration. Typically, the UPS device is designed to deliver high power for a period of about 10 seconds to about 2 hours, at average rates of about 0.5 D to about 10 D (wherein, "F×D", for example, is a rate corresponding to the full discharge of the energy storage battery in 1/f hour).

$$F \times D = \text{Total energy of battery} * f(1/\text{hour});$$

i.e., $0.5D = 100$ watt hour $* 0.5(1/\text{hour}) = 50W$

Additionally the increased power density may help in reducing the number of cells required for the energy storage device, which may directly lead to reducing the cost, size and weight of the article or device. Further, increasing the useful life of the article or the energy storage device may lower the cost-per-product-per-year, installed. Embodiments of the invention also provide a method of forming the energy storage device.

As used herein, a cathodic material is a material that supplies electrons during the charging process of a battery, and is present as part of a redox reaction. In contrast, an anodic material accepts electrons during the charging process of a battery, and is also present as part of the redox reaction. The positive electrode includes cathodic materials having differing functions: an electrode material, a support structure, and a current collector. The electrode materials are present in the positive electrode as participating electrochemical reactants, both in their oxidized or reduced state, or at some state between full oxidation or reduction. The electroactive metal is a usually a metal that oxidizes in molten sodium tetrachloroaluminate to the metal salt, above the oxidation potential of aluminum (about 1.58 V vs. Na), and below the oxidation potential of chloride (about 4.15 V vs. Na).

The support structure of the positive electrode usually does not undergo any significant change during any chemical reaction in the charge/discharge states. However, the support structure does provide electron transport, and supports the electrode material as it undergoes chemical reaction, and allows for a surface upon which solids may precipitate as needed. (An electrolyte is a medium that provides an ion transport mechanism between the positive and negative electrodes of a cell, and may act as a solvent for the oxidized form of the electrode material). Additives that facilitate the ion transport mechanism, but do not themselves provide the mechanism, are distinguished from the electrolyte itself.

The electroactive metal of the positive electrode composition may be at least one transition metal selected from the group consisting of titanium, vanadium, niobium, molybdenum, nickel, cobalt, chromium, manganese, molybdenum, and silver. In other embodiments, the electroactive metal may be at least one metal selected from antimony, cadmium, tin, lead, and zinc. In one specific embodiment, the electroactive metal is antimony.

In one embodiment, the electroactive metal (or several of the metals) may be employed in the form of a salt. For example, nitrates, sulfides, or halides of the electroactive metal can be used. In one embodiment, halide salts (one or more of them) are preferred.

In some instances, the amount of electroactive metal present in the positive electrode composition is in a range from about 10 volume percent to about 20 volume percent, based on the volume of the positive electrode composition. In another embodiment, the amount of electroactive metal present is in a range from about 11 volume percent to about 19 volume percent. In yet another embodiment, the amount of electroactive metal present is in a range from about 12 volume percent to about 18 volume percent. One skilled in the art will appreciate that the electroactive metal, for example, nickel, functions as the positive electrode grid. If the amount of nickel is not high enough to percolate electric current, the cell may not function as expected. On the other hand, an amount of nickel that is in excess of what is needed to percolate the current may occur at the expense of the desirable levels of the electrolyte salt and/or the alkali metal halide, both of which perform critical functions.

The positive electrode composition includes iron. In one embodiment, the amount of iron present in the positive electrode composition is in a range from about 0.2 volume percent to about 3 volume percent, based on the volume of the positive electrode composition. In another embodiment, the amount of iron present in the positive electrode composition is in a range from about 0.5 volume percent to about 2 volume percent. In yet another embodiment, the amount of iron present in the positive electrode composition is in a range from about 0.7 volume percent to about 1.4 volume percent. As noted in other portions of this disclosure, the present inventors have discovered that the presence of iron at these reduced levels, as compared to iron levels used in other positive electrode compositions, can provide significant advantages for electrochemical cells that incorporate such positive electrodes. (See, for example, U.S. Pat. No. 5,972,533, which describes, in detail, the operation of an electrochemical cell)

The positive electrode composition also includes a first alkali metal halide. In one embodiment, the first alkali metal halide is at least one alkali metal halide selected from sodium chloride, sodium iodide, sodium bromide, sodium fluoride, potassium chloride, potassium iodide, potassium bromide, potassium fluoride, lithium chloride, lithium iodide, lithium bromide, lithium fluoride, and cesium chloride. In some specific embodiments, the first alkali metal halide is selected from the group consisting of sodium chloride, sodium iodide, and lithium chloride.

In one embodiment, the amount of the first alkali metal halide present in the positive electrode composition is in a range from about 20 volume percent to about 50 volume percent, based on the volume of the positive electrode composition. In another embodiment, the amount of the first alkali metal halide present in the positive electrode composition is in a range from about 22 volume percent to about 48 volume percent. In yet another embodiment, the amount of the first alkali metal halide present in the positive electrode composition is in a range from about 25 volume percent to about 45 volume percent.

The electrolyte salt of the positive electrode composition comprises the reaction product of a second alkali metal halide and an aluminum halide. In some specific embodiments, the aluminum halide is aluminum chloride. The electrolyte salt should have a melting point of less than about 300 degrees Celsius. In one embodiment, the electrolyte salt has a melting point in a range from about 300 degrees to about 250 degrees Celsius, from about 250 degrees Celsius to about 200 degrees Celsius, or from about 200 degrees Celsius to about 150 degrees Celsius. In one embodiment, the melting point of the electrolyte salt is about 185 degrees Celsius.

In one embodiment, the second alkali metal halide is at least one alkali metal halide selected from sodium chloride, sodium iodide, sodium bromide, sodium fluoride, potassium chloride, potassium iodide, potassium bromide, potassium fluoride, lithium chloride, lithium iodide, lithium bromide, lithium fluoride, and cesium chloride. In one embodiment, the second alkali metal halide is sodium chloride.

In one embodiment, the amount of electrolyte salt employed is in a range of about 22 weight percent to about 35 weight percent, based on the total amount of the positive electrode composition. In another embodiment, the amount of electrolyte salt employed is in a range of about 25 weight percent to about 32 weight percent, based on the total amount of the positive electrode composition. In yet another embodiment, the amount of electrolyte salt employed is in a range of about 28 weight percent to about 30 weight percent, based on the total amount of the positive electrode composition.

In one embodiment, the second alkali metal halide and the metal halide of the electrolyte salt, are present in a molar ratio in a range from about 1:1 to about 1:2 in the reaction product. In another embodiment, the second alkali metal halide and the metal halide are present in a molar ratio in a range from about 0.53:0.48 to about 0.45:0.55 in the reaction product. In one embodiment, the electrolyte salt is sodium tetrachloroaluminate, which is a reaction product of sodium chloride and aluminum chloride.

In one embodiment, the positive electrode composition may further include aluminum, i.e., in a form other than an electrolyte salt or an aluminum halide. (Usually, the aluminum would be in elemental form, e.g., aluminum metal flakes or particles). The aluminum may assist in improving the porosity of the granules formed using the electroactive metal, iron, and the alkali metal halide, as described in the Examples. In one embodiment, the amount of aluminum present in the positive electrode composition is in a range from about 0.2 volume percent to about 0.5 volume percent, based on the volume of the positive electrode composition. In another embodiment, the amount of aluminum present in the positive electrode composition is in a range from about 0.25 volume percent to about 0.45 volume percent. In yet another embodiment, the amount of aluminum present in the positive electrode composition is in a range from about 0.3 volume percent to about 0.4 volume percent.

In one embodiment (though not all embodiments, as discussed below), the positive electrode composition may further comprise sulfur, in the form of molecular sulfur or a sulfur-containing compound. If present, the level of sulfur is usually in the range from about 0.1 weight percent to about 3 weight percent, based on the total weight of the positive electrode composition.

In some other preferred embodiments, the positive electrode composition is substantially free of sulfur, i.e., containing, at most, impurity levels. The absence of sulfur is desirable in some cases, because sulfur may be corrosive to diffusion bonds between ceramics and metals, which are often used in the electrochemical cells. Also sulfides have been demonstrated to sometimes reduce performance in UPS applications.

In one embodiment, the positive electrode composition may include other additives that may beneficially affect the performance of an energy storage device. Such performance additives may increase ionic conductivity, increase or decrease solubility of the charged cathodic species, improve wetting of a solid electrolyte, i.e., the separator, by a molten electrolyte, or prevent "ripening" of the positive electrode microdomains, to name several utilities. In one embodiment, the performance additive may be present in an amount that is less than about 5 mole percent, based on the total, combined moles of the first alkali metal halide, the electrolyte salt, and the electroactive metal present in the positive electrode composition. In one embodiment, the performance additive may be an alkali metal halide salt. In some cases, the performance additive may comprise a bromide salt, a fluoride salt, or an iodide salt of an alkali metal halide. Suitable examples of performance additives include sodium iodide and sodium fluoride.

In accordance with one aspect of the present invention, an article is provided. The article includes a positive electrode composition, as described herein. As one non-limiting example, the article can be an energy storage device. The device usually includes (a) a first compartment comprising an alkali metal; (b) a second compartment including a positive electrode composition (as set forth above); and (c) a solid separator capable of transporting alkali metal ions between the first and the second compartments.

The device usually includes a housing having an interior surface defining a volume. A separator is disposed in the volume. The separator has a first surface that defines at least a portion of a first compartment, and a second surface that defines a second compartment. The first compartment is in ionic communication with the second compartment through the separator. As used herein, the phrase "ionic communication" refers to the traversal of ions between the first compartment and the second compartment, through the separator.

Referring to FIG. 1 an electrochemical cell 100 is provided. More particularly a front cross-sectional view 110 of the electrochemical cell 100 is provided. The electrochemical cell 100 includes a housing 112. The housing 112 has an interior surface 114 defining a volume. A separator 116 is disposed inside the housing 112. The separator 116 has a first surface 118 that defines a first compartment 120, i.e., an anode compartment. The separator has a second surface 122 that defines a positive electrode compartment 124. An anode current collector 126 is connected to the anode compartment 120. A positive electrode current collector 128 is connected to the positive electrode compartment 124. A positive electrode composition 130 is disposed inside the positive electrode compartment 124. The positive electrode composition 130 mainly includes at least one electroactive metal, iron, an alkali metal halide, and an electrolyte salt. As described previously, the electroactive metal is present in an amount in a range from about 10 volume percent to about 20 volume percent, based on the volume of the positive electrode composition; and iron is present in an amount in a range from about 0.2 volume percent to about 3 volume percent, based on the volume of the positive electrode composition. The working temperature of the electrochemical cell 100, when it is a sodium-nickel chloride cell, is about 300 degrees Celsius.

The housing can be sized and shaped to have a cross-sectional profile that is square, polygonal, circular, or cloverleaf, to provide maximal surface area for alkali metal ion transport; and can have a width-to-length ratio that is greater than about 1:10, along a vertical axis 132. In one embodiment, the length-to-width ratio of the housing is in a range of from about 1:10 to about 1:5, from about 1:5 to about 1:1, from about 1:1 to about 5:1, from about 5:1 to about 10:1, or from about 10:1 to about 15:1. The housing can be formed from a material that is a metal, ceramic, or a composite. The metal can be selected from nickel or steel, and the ceramic is typically a metal oxide.

The ionic material transported across the separator between the anode compartment and the positive electrode compartment can be an alkali metal. Suitable ionic materials may include one or more of sodium, lithium and potassium.

Typically, the anode compartment is empty in the ground state (uncharged state) of the electrochemical cell, and is then filled with metal from reduced metal ions that move from the positive electrode compartment to the anode compartment through the separator, during operation of the cell. The anodic material, for example, sodium, is molten during use. The first compartment or the anode compartment may receive and store a reservoir of anodic material.

Additives suitable for use in the anodic material may include a metal oxygen scavenger. Suitable metal oxygen scavengers may include one or more of manganese, vanadium, zirconium, aluminum, or titanium. Other useful additives may include materials that increase wetting of the separator surface 116, defining the anode compartment, by the molten anodic material. Additionally, some additives may enhance the contact or wetting between the separator and the current collector, to ensure substantially uniform current flow throughout the separator.

The separator is usually an alkali metal ion conductor solid electrolyte that conducts alkali metal ions during use between the first compartment and the second compartment. Suitable materials for the separators may include an alkali-metal-beta'-alumina, alkali-metal-beta"-alumina, alkali-metal-beta'-gallate, or alkali-metal-beta'-gallate. In various embodiments, the solid separator may include a beta-alumina, a beta"-alumina, a gamma alumina, a micromolecular sieve, for example, a tectosilicate, such as a felspar, or a felspethoid; or a zeolite, e.g., a synthetic zeolite such as zeolite 3A, 4A, 13X, or ZSM-5. Other exemplary separator materials are rare-earth silicophosphates; silicon nitride; or other types of silicophosphates (e.g., NASICON: $Na_3Zr_2Si_2PO_{12}$). In one embodiment, the separator comprises a beta alumina material. In another embodiment, a portion of the separator is alpha alumina; and another portion of the separator is beta alumina. The alpha alumina may be relatively more amenable to bonding (e.g., compression bonding) than beta alumina, and may help with sealing and/or fabrication of the energy storage device.

The separator of the electrochemical cell may be stabilized by the addition of small amounts of a dopant. The dopant may include one or more oxides selected from lithia, magnesia, zinc oxide, and yttria. These stabilizers may be used alone, or in combination with themselves (i.e., other stabilizers), or with other materials. In one embodiment, the separator comprises a beta alumina separator electrolyte (BASE), and may include one or more dopants.

As noted above, the separator is disposed within the volume of the housing 112. The separator may have a cross-sectional profile normal to a vertical axis 132 of the housing 112, for example, a circle, a triangle, a square, a cross, or a star. Alternatively, the cross-sectional profile of the separator can be planar about the vertical axis 132. A planar configuration (or one with a slight dome) may be useful in a prismatic or button-type battery configuration, where the separator is domed or dimpled. Similarly, the separator can be flat or undulated. In one embodiment, the solid separator may include a shape that may be flat, undulated, domed or dimpled, or that comprises a shape with a cross-sectional profile that may be an ellipse, triangle, cross, star, circle, cloverleaf, rectangular, square, or multi-lobal.

The separator can be a tubular container in one embodiment, having at least one wall. The thickness of the wall will influence the ionic conductivity and the resistance across the wall. In some embodiments, the thickness of the wall is less than about 5 millimeters. A cation facilitator material can be disposed on at least one surface of the separator, in one embodiment. The cation facilitator material may include, for example, selenium.

Optionally, one or more shim structures can be disposed within the volume of the housing. The shim structures support the separator within the housing. The shim structures can protect the separator from vibrations caused by motion of the cell during use, and thus reduce or eliminate movement of the separator, relative to the housing. In one embodiment, a shim structure can function as a current collector.

The energy storage device may include a plurality of current collectors, including anode current collectors and positive electrode current collectors. The anode current collector is in electrical communication with the anode chamber, and the positive electrode current collector is in electrical communication with the contents of the positive electrode chamber. Suitable materials for the anode current collector may include steel, tungsten, titanium, nickel, copper, molybdenum, and combinations of two or more of the foregoing metals. Other suitable materials for the anode current collector may include carbon. The positive electrode current collector may be a wire, paddle or mesh formed from nickel, molybdenum, tungsten, platinum, palladium, gold, nickel, copper, carbon, or titanium. The current collector may be plated or clad. In one embodiment, the current collector is free of iron. The plurality of current collectors can have thickness greater than about 1 millimeter (mm).

The second compartment of the energy storage device includes the positive electrode composition of the present invention. As noted above, the positive electrode composition comprises: at least one electroactive metal; iron; and an alkali metal halide. The electroactive metal may be at least one selected from the group consisting of titanium, vanadium, niobium, molybdenum, nickel, cobalt, chromium, manganese, silver, antimony, cadmium, tin, lead, and zinc.

In one specific embodiment, the alkali metal forming the first alkali metal halide may be sodium, and the separator may be beta-alumina. In another embodiment, the alkali metal forming the first alkali metal halide may be potassium or lithium, with the separator then being selected to be compatible therewith.

In accordance with one aspect of the present invention, an uninterruptable power supply (UPS) device is provided. The article includes a positive electrode composition. The positive electrode composition includes at least one electroactive metal selected from the group consisting of titanium, vanadium, niobium, molybdenum, nickel, cobalt, chromium, manganese, silver, antimony, cadmium, tin, lead, and zinc; wherein the electroactive metal is present in an amount in a range from about 10 volume percent to about 20 volume percent, based on the volume of the positive electrode composition. The composition further includes iron present in an amount in a range from about 0.2 volume percent to about 3 volume percent, based on the volume of the positive electrode composition; a first alkali metal halide; and an electrolyte salt comprising a reaction product of a second alkali metal halide and an aluminum halide. The electrolyte salt usually has a melting point of less than about 300 degrees Celsius.

In accordance with another aspect of the present invention, a method for the preparation of the energy storage device is provided. The method comprises providing a housing having an interior surface defining a volume; and disposing a separator inside the housing. The separator has a first surface that defines at least a portion of a first compartment, and a second surface that defines a second compartment. The first compartment is in ionic communication with the second compartment through the separator. The method also includes the step of disposing a positive electrode composition in the second compartment. (The positive electrode composition is fully described elsewhere in this disclosure). Some embodiments of this method may comprise operating the battery through a plurality of battery charge/discharge cycles, to activate or condition the positive electrode composition material.

A plurality of the electrochemical cells can be organized into an energy storage system. Multiple cells can be connected in series or parallel, or in a combination of series and parallel. For convenience, a group of coupled cells may be referred to as a module or pack. The ratings for the power and energy of the module may depend on such factors as the number of cells in the module. Other factors may be based on specific criteria for end-use applications.

In one embodiment, the energy storage device may be rechargeable over a plurality of charge-discharge cycles. In another embodiment, the energy storage device may be employed in a variety of applications; and the plurality of cycles for recharge is dependent on factors such as charge and discharge current, depth of discharge, cell voltage limits, and the like.

Various embodiments of the energy storage system can store an amount of energy that is in a range of from about 0.1 kiloWatt hours (kWh) to about 1000 kWh. One embodiment of the energy storage system has an energy-by-weight ratio of greater than about 100 Watt-Hours per kilogram, and/or an energy-by-volume ratio of greater than about 200 Watt-Hours per liter. Another embodiment of the energy storage system has a specific power rating of greater than about 150 Watts per kilogram; and/or an energy-by-volume ratio of greater than about 300 Watt-Hours per liter.

Suitable energy storage systems may have an application specific power to energy ratio of less than about 10 per hour to about 1 per hour. In one embodiment, the specific power to energy ratio is in a range from about 1:1 to about 2:1, from about 2:1 to about 4:1, from about 4:1 to about 6:1, from about 6:1 to about 8:1, or from about 8:1 to about 10:1. In other embodiments, the power to energy ratio is in range from about 1:1 to about 1:2, from about 1:2 to about 1:4, from about 1:4 to about 1:6, from about 1:6 to about 1:8, or from about 1:8 to about 1:10.

In one embodiment of the energy storage system, a controller communicates with the plurality of the cells. The controller can distribute an electrical load to select cells in a cell module, in response to feedback signals indicating states for each of the cells in the cell module. The controller can perform a re-warm method, in which a series of heating elements are activated in a sequence to melt a frozen portion of the energy storage device in a pre-determined manner. In another embodiment, the controller may distribute an electrical load to select cathodic materials at pre-determined locations within individual cells.

In one embodiment, a heat management device maintains the temperature of the energy storage system. The heat management device can warm the energy storage system if it becomes too cold, and can cool the energy storage system if it becomes too hot, to prevent an accelerated cell degradation. The heat management system often includes a thaw profile that can maintain a minimal heat level in the anode and positive electrode chambers, to avoid freezing of cell reagents.

Another embodiment of the invention provides an energy management system that includes a second energy storage device that differs from the first energy storage device. This dual energy storage device system can address the ratio of power to energy, in that a first energy storage device can be optimized for efficient energy storage, and a second energy storage device can be optimized for power delivery. The control system can draw from either energy storage device, as needed, and charge back either energy storage device that needs such a charge.

Suitable second energy storage devices, for the power piece, include a primary battery, a secondary battery, a fuel cell, or an ultracapacitor. A suitable secondary battery may be a lithium battery, lithium ion battery, lithium polymer battery, or a nickel metal hydride battery.

EXAMPLES

The following examples illustrate methods and embodiments in accordance with the invention, and as such should not be construed as imposing limitations upon the claims. Unless specified otherwise, all of the components are commercially available from common chemical suppliers, as indicated in Table 1 below.

TABLE 1

| Material | Source | Properties |
| --- | --- | --- |
| Nickel 255 (metal nickel powder) | Inco Special products | 97.9 percent pure, 0.6 square meters per gram surface area, 2.2 to 2.8 micrometers particle size) |
| Sodium Chloride | Custom Powders Ltd, UK | 99.99 percent pure |
| Iron (metal iron powder) | Alfa Aesar Item #00170, | less than 10 micrometers particle size, 99.9 percent pure |
| Aluminum powder | Alfa Aesar Item #42919 | −100 + 325 mesh particle size, 99.97 percent pure |
| Sodium Fluoride | Sigma Aldrich | ~99 percent pure |
| Sodium iodide | Sigma Aldrich | ~99 percent pure |

The sodium chloride (NaCl) was heat treated at 220 degrees Celsius under vacuum, and milled to an average particle size of 90 percent less than 75 micrometers in a laboratory mill, in a dry glove box. Positive electrode materials including metal nickel powder, sodium chloride, sodium fluoride, sodium iodide, iron, and aluminum powder were pressed at ambient room temperature (typically 18 degree Celsius to about 25 degree Celsius), under a linear pressure of about 110 bar to about 115 bar using an Alexanderwerk WP50N/75 Roll Compactor/Milling Machine. The pressurized material was ground under a rotating mill into granules; and the fraction containing a particle size of about 0.325 to about 1.5 millimeters was used for the cell assembly.

Preparation of Electrolyte Salt: Sodium Tetrachloroaluminate

Sodium chloride and aluminum chloride were mixed and melted together to produce sodium tetrachloroaluminate (NaAlCl$_4$). Aluminum chloride was volatile when melted, so mixing and melting of the electrolyte salt was done as a separate step, before electrochemical cell fabrication.

Preparation of the electrolyte salt was carried out in a nitrogen purge box, to keep the materials dry. To produce a 750 gram batch of NaCl-rich (basic) sodium tetrachloroaluminate, 500 grams of aluminum chloride and 250 grams of sodium chloride were mixed in a 500-milliliter reaction vessel. The reaction vessel was sealed with a clamped lid equipped with a gas outlet that was connected to a mineral oil bubbler, to relieve any pressure.

The reaction vessel containing the dry powders was heated to 330 degrees Celsius, which was above the melting point of the electrolyte salt mixture. Once melted, about 5 grams to 10 grams of aluminum powder was introduced to the molten salt. The aluminum powder, which oxidizes readily, acts to scavenge impurities present in the raw materials.

Once melted, with impurities precipitated out, the sodium tetrachloroaluminate was filtered to remove the aluminum powder and the precipitates. The molten salt was filtered through a heated (from about 200 to about 300 degrees Celsius) glass frit (25 micrometers minimum pore size). The filtered molten salt was collected on aluminum foil. Once the filtered molten salt had solidified, it was manually chipped into smaller pieces, and then milled in a dedicated, laboratory-scale, grinding mill for 60 seconds. The sodium tetrachloroaluminate powder was stored in a glove box, for use in cell fabrication as an electrolyte salt. Optionally, where needed, a portion of the sodium tetrachloroaluminate powder was combined with nickel chloride salt and sodium chloride, to produce a ternary electrolyte, which was stored in a glove box for use in cell fabrication.

Preparation of Electrochemical Cell

The electrochemical cell 100 was assembled as follows. Separator tubes, cylindrical or cloverleaf in shape, were produced according to known methods, and in some instance, were commercially obtained. Each tube 116 was formed of a ceramic sodium conductive beta"-alumina, and had a cloverleaf shape. Each ceramic separator tube was glass-sealed to an alpha alumina collar, to form an assembly. Each assembly was placed in a stainless steel housing 112 that served as the housing to form an electrochemical cell. The housing size was about 36 millimeters×36 millimeters×230 millimeters.

The electrode composition granules prepared using the procedure mentioned above, were placed in the β"-alumina tube. The β"-alumina tube was preassembled with an anode chamber and a positive electrode current collector, and densified by vibration on a vibratory shaker in a nitrogen filled glove box. The positive electrode was then filled with the molten sodium tetrachloroaluminate NaAlCl$_4$ (as prepared above) under vacuum at 280 degrees Celsius. Following this, the cell was welded at a temperature of about 230 degrees Celsius inside the glove box, using a MaxStar Miller Welder, with ultra-high purity argon purge, and tested for leaks.

Cell Test Protocol

Cell testing was performed with a 100 A, 10V, multi-channel Digatron BTS600 battery testing system. The cell was connected with four cables: positive and negative potential sense, and positive and negative current supply. The positive voltage and current cables were connected to the positive tab. The negative voltage and current cables were connected to the negative tab.

All cells were assembled in the discharged state. (In practice, the cells can also be assembled in the charged or partially-charged state). The protocol for the 2×2 set of experiments was representative of UPS qualification testing. Each composition i.e., E-1, E-2, and E-3, was subjected to the protocol three times. The testing protocol was as follows:

1. Starting at 8 milli Amperes (mA) and ramping up to 5.5 amperes (A) over time, charge to 2.67 volts (V), then at 2.67 V to a current of 500 mA, while at 330 degrees Celsius.
2. Reduce temperature to 300 degrees Celsius and discharge at −16 A to 1.8V or 32 Ah.

3. Charge at 10 A to 2.67 V, then at 2.67 V down to 500 mA.
4. Discharge at −16 A to 1.8V or 32 ampere hours (Ah).
5. Repeat steps 3 and 4 a total of 10 cycles.
6. Charge at 15 A to 2.67 V, then at 2.67 V to a current of 500 mA.
7. Discharge at −155 W to 1.8 V.
8. Charge at 15 A to 2.67 V, then at 2.67 V, to a current of 500 mA.
9. Discharge at −60 W to 22 Ah or 1.8 V.
10. Charge at 15 A to 2.67 V, then at 2.67 V to a current of 500 mA.
11. Discharge at −110 W to 1.8 V or 15 minutes, then at 1.8V to 15 minutes.
12. Repeat steps ten and eleven 100 times.
13. Go to step 6 to repeat steps 6-12 once, for a total of 214 cycles.

Step 1 is the maiden charge, which starts at low current, to avoid excessive current densities during the initial production of sodium in the negative electrode. Steps 3 and 4 are mild conditioning cycles before the start of the UPS testing. Step 7 is a high-power discharge to test the cells at the power target of 155 Watts. Step 9 is a low-power cycle to measure cell resistance at high Depths of Discharge (DoD). Steps 10 and 11 are the representative UPS qualification cycles. The protocol ends after only 214 cycles to maximize cell-testing throughput while still getting enough data to make initial performance comparisons. The protocol was developed to measure progress toward 155 Watts capability.

Examples 1-2 (E-1, E-2) and Comparative Example (CE-1)

Cells having similar compositions were assembled and tested according to the testing protocol. The positive electrode compositions are given in Table 2, and the cell testing results are provided in FIG. 2.

TABLE 2

Positive electrode composition of Example Cells and Control Cells

| Materials | Examples | | |
|---|---|---|---|
| Volume percent | CE-1 | E-1 | E-2 |
| Sodium chloride | 34.08 | 32.61 | 26.78 |
| Nickel | 9.46 | 10.27 | 12.54 |
| Iron | 0 | 0.64 | 2.7 |
| Aluminum | 0.34 | 0.37 | 0.45 |
| Sodium fluoride | 0.99 | 1.08 | 1.32 |
| Sodium iodide | 0.2 | 0.21 | 0.26 |
| Sodium tetrachloroaluminate | 54.93 | 54.81 | 56.89 |

Figure 2:
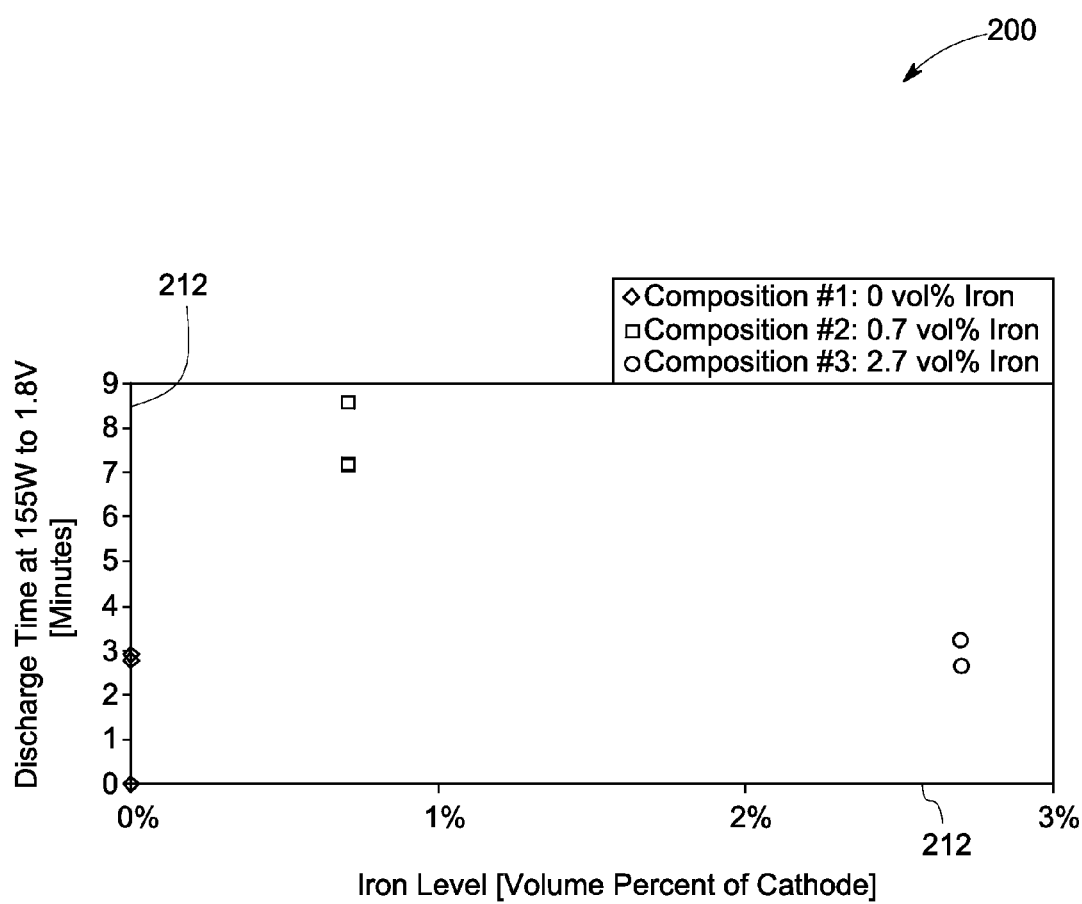
FIG. 2 is a graphical representation of the discharge time of an electrochemical cell consisting of a positive electrode composition in accordance with the embodiments described herein.

The cell testing results are provided in FIG. 2. For each composition, three cells were tested using the cell testing protocol. Referring to FIG. 2, a graph 200 shows the discharge time of cells in accordance with embodiments of the invention. The results shown in the graph were obtained for an average of about 3 cells, with the positive electrode being made from the composition of E-1, E-2, and CE-1. The graph includes discharge time at 155 W to 1.8 V in minutes on the Y-axis 210, versus volume percent of iron in the positive electrode composition on the X-axis 212. The graph clearly indicates that the discharge time of the cell with 0 percent iron is about 0 to 3 minutes. There is a marked increase in the discharge time to about 7 to 8.5 minutes as the amount of iron is increased, as observed for E-1, with 0.7 volume percent of iron. As the volume percent of iron in the positive electrode composition tends towards 3 volume percent, the discharge time again reduces to about 3 minutes. This indicates that an amount of iron between about 0.2 volume percent and about 3 volume percent provides a battery with an increased discharge time. The present inventors have discovered that the presence of iron at certain, relatively low levels can be important, but that higher levels of iron, e.g., above about 3 volume percent, can have a detrimental effect on energy discharge times.

The foregoing examples are illustrative of some features of the invention. The appended claims are intended to claim the invention as broadly as has been conceived; and the examples herein presented are illustrative of selected embodiments from a manifold of all possible embodiments. Accordingly, it is Applicants' intention that the appended claims not be limited to the illustrated features of the invention by the choice of examples utilized. Where necessary, ranges have been supplied, and those ranges are inclusive of all sub-ranges there between. It is to be expected that variations in these ranges will suggest themselves to a practitioner having ordinary skill in the art and, where not already dedicated to the public, the appended claims should cover those variations.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have a utility distinct from the utility of the reaction product or final material. Other subsequent changes, transformations, or reactions may result from bringing the specified reactants and/or components together under the conditions called for pursuant to this disclosure. In these other subsequent changes, transformations, or reactions, the reactants, ingredients, or the components to be brought together may identify or indicate the reaction product.

All ranges disclosed herein are inclusive of the endpoints, and the endpoints are combinable with each other. The terms "first," "second," and the like, as used herein, do not denote any order, quantity, or importance, but rather are used to distinguish one element from another. While the invention has been described in detail in connection with a number of embodiments, the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention should not be limited by the foregoing description, but is only limited by the scope of the appended claims.

The invention claimed is:
1. A positive electrode composition comprising:
at least one electroactive metal selected from the group consisting of titanium, vanadium, niobium, molybdenum, nickel, cobalt, chromium, manganese, silver, antimony, cadmium, tin, lead, and zinc; wherein the electroactive metal is present in an amount in a range from about 10 volume percent to about 20 volume percent, based on the volume of the positive electrode composition;

iron present in an amount in a range from about 0.5 volume percent to about 1.4 volume percent, based on the volume of the positive electrode composition;

a first alkali metal halide;

an electrolyte salt comprising a reaction product of a second alkali metal halide and an aluminum halide, wherein the electrolyte salt has a melting point of less than about 300 degrees Celsius; and sulfur present in an amount in a range from about 0.1 weight percent to about 3 weight percent based on the total weight of the positive electrode composition.

2. The positive electrode composition of claim 1, wherein the aluminum halide is aluminum chloride.

3. The positive electrode composition according to claim 1, wherein the at least one electroactive metal is nickel.

4. The positive electrode composition according to claim 1, wherein the first and second alkali metals comprise, independently, sodium, potassium, or lithium.

5. The positive electrode composition according to claim 1, wherein the first and second halides comprise, independently, at least one halogen selected from chlorine, bromine, and fluorine.

6. The positive electrode composition according to claim 1, wherein the electroactive metal is present in a range of from about 11 volume percent to about 19 volume percent, based on the volume of the positive electrode composition.

7. The positive electrode composition according to claim 1, wherein sulfur is present in the form of molecular sulfur, or a sulfur-containing compound.

8. The positive electrode composition according to claim 1, further comprising additional aluminum, in a form other than the aluminum halide.

9. The positive electrode composition according to claim 8, wherein the additional aluminum is present in a range of from about 0.2 volume percent to about 0.5 volume percent, based on the volume of the positive electrode composition.

10. An article, comprising:
a positive electrode, which itself comprises:
at least one electroactive metal selected from the group consisting of titanium, vanadium, niobium, molybdenum, nickel, cobalt, chromium, manganese, silver, antimony, cadmium, tin, lead, and zinc; wherein the electroactive metal is present in an amount in a range from about 10 volume percent to about 20 volume percent based on the volume of the positive electrode composition;
iron present in an amount in a range from about about 0.5 volume percent to about 1.4 volume percent, based on the volume of the positive electrode composition;
a first alkali metal halide;
an electrolyte salt comprising a reaction product of a second alkali metal halide and an aluminum halide, wherein the electrolyte salt has a melting point of less than about 300 degrees Celsius; and
sulfur present in an amount in a range from about 0.1 weight percent to about 3 weight percent based on the total weight of the positive electrode composition.

11. The article according to claim 10, wherein the article is an energy storage device.

12. The article according to claim 10, in the form of an uninterruptable power supply device.

13. An uninterruptable power supply device comprising:
a positive electrode which itself comprises
at least one electroactive metal selected from the group consisting of titanium, vanadium, niobium, molybdenum, nickel, cobalt, chromium, manganese, silver, antimony, cadmium, tin, lead, and zinc; wherein the electroactive metal is present in an amount in a range from about 10 volume percent to about 20 volume percent, based on the volume of the positive electrode composition;
iron present in an amount in a range from about 0.5 volume percent to about 1.4 volume percent, based on the volume of the positive electrode composition;
a first alkali metal halide;
an electrolyte salt comprising a reaction product of a second alkali metal halide and an aluminum halide, wherein the electrolyte salt has a melting point of less than about 300 degrees Celsius; and
sulfur present in an amount in a range from about 0.1 weight percent to about 3 weight percent based on the total weight of the positive electrode composition.

14. A positive electrode composition comprising:
nickel in an amount in a range from about 10 volume percent to about 20 volume percent, based on the volume of the positive electrode composition;
iron present in an amount in a range from about 0.5 volume percent to about 1.4 volume percent, based on the volume of the positive electrode composition;
a first alkali metal halide selected from sodium chloride, sodium fluoride, sodium iodide, and a combination thereof;
an electrolyte salt comprising a reaction product of
(a) a second alkali metal halide selected from sodium chloride, sodium fluoride, sodium iodide, and a combination thereof; and
(b) an aluminum halide,
wherein the electrolyte salt has a melting point of less than about 300 degrees Celsius; and
sulfur present in an amount in a range from about 0.1 weight percent to about 3 weight percent based on the total weight of the positive electrode composition.

* * * * *